(No Model.) 2 Sheets—Sheet 2.
L. V. LEWIS & S. S. ALLEN.
CORN HARVESTING MACHINE.
No. 322,459. Patented July 21, 1885.
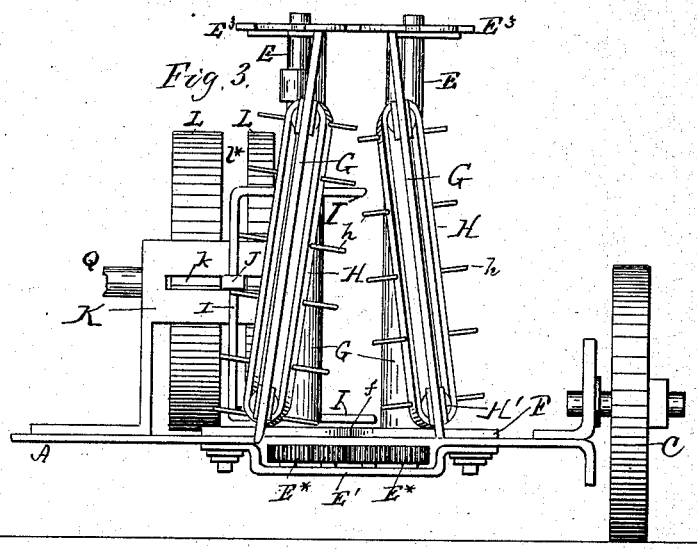
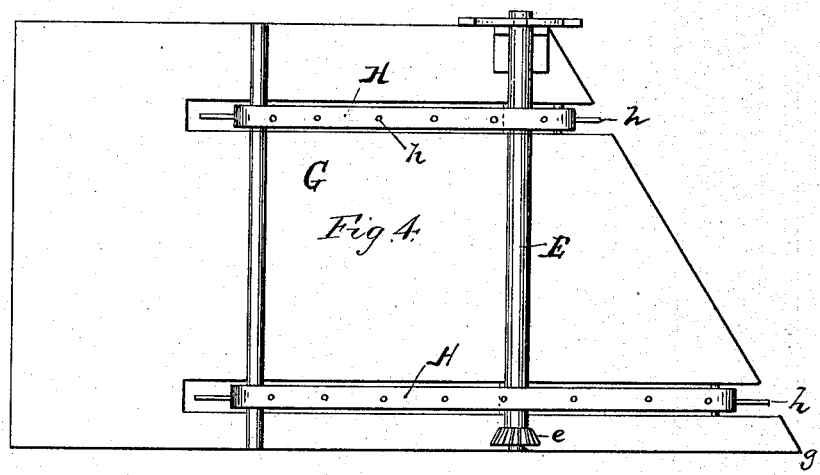
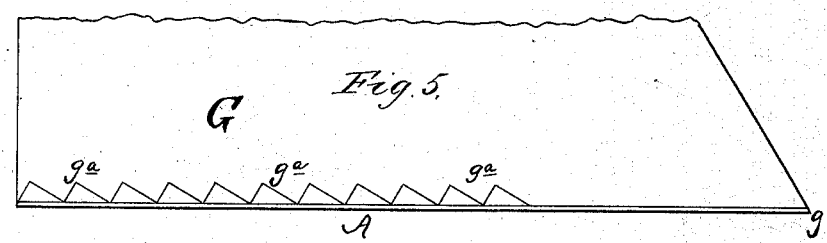
Witnesses.
Chas. S. Kalb
Eldno Mobberley
Inventors:
L. V. Lewis
and S. S. Allen
By I. N. Kalb
Attorney

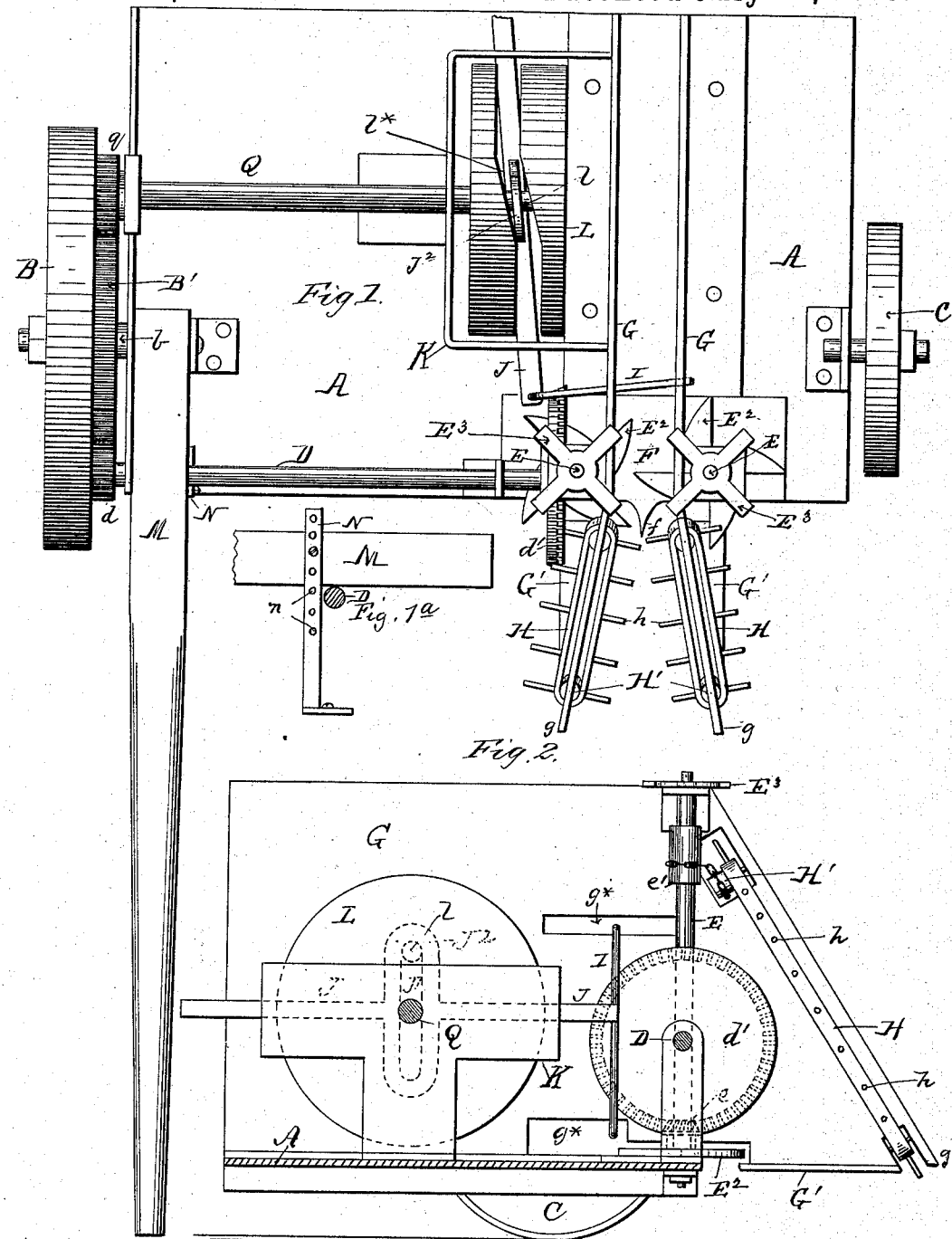

UNITED STATES PATENT OFFICE.

LEDYARD VERDINE LEWIS AND STEPHEN STOWE ALLEN, OF SUN PRAIRIE, WISCONSIN.

CORN-HARVESTING MACHINE.

SPECIFICATION forming part of Letters Patent No. 322,459, dated July 21, 1885.

Application filed March 26, 1884. (No model.)

*To all whom it may concern:*

Be it known that we, LEDYARD VERDINE LEWIS and STEPHEN STOWE ALLEN, citizens of the United States, residing at Sun Prairie, in the county of Dane and State of Wisconsin, have invented certain new and useful Improvements in Corn-Harvesting Machines; and we do hereby declare the following to be a full, clear, and exact description of the invention, such as will enable others skilled in the art to which it appertains to make and use the same.

Our invention relates to corn-harvesters, and has for its object the production of a machine for cutting corn by horse or steam power in the field in such a manner as to keep the stalks held in a vertical position until bundled and ready to deliver to the ground.

On the frame of the machine we provide guide-boards which extend in an upright and practically parallel position back of the cutting devices. In front of the cutting devices they are flared outward, so as to more readily receive the stalks between them. They are pointed or sloped from the top to the bottom, so as to project farthest ahead at the bottom and present a sharp or rounded corner or nose to enter between the rows of stalks and guide them into the cutting device as the machine advances. The sloping front faces of the boards or guide-frame are provided with moving projecting fingers or teeth, which still further assist in drawing the stalks into the machine. These fingers or teeth are set upon a belt or chain, which is carried over rollers at bottom and top, and are operated as hereinafter set forth. After the stalks are severed they are taken hold of by intermittently-working arms and conveyed rearwardly between the boards or guide-frames. These arms are worked by a cam whose construction is such as to cause them to be protruded across the space between the boards or guide-frames and drawn backward while thus protruded, so as to convey the stalks rearwardly in the machine, and then to cause the arms to be withdrawn from between the boards or guide-frames, and while thus withdrawn to be thrown forward to again be protruded into the space and receive behind them more severed stalks, and convey them through between the boards or guide-frames, and so on as long as the machine is operated.

The following description and claims will more fully define our invention.

The accompanying drawings illustrate what we consider the best means for carrying out our invention.

Figure 1 is a plan view of our harvester. Fig. 1$^a$ is a detail showing the means for adjusting the frame on the tongue. Fig. 2 is a section of the base or frame, taken between the driving-wheel and the cam-plates, showing a side elevation of the guide-boards and many other parts. In this figure the shaft Q is shown in section and the pin $l$ in its highest position, so that both pin and shaft are in line; but it will be understood that the shaft Q does not enter between the cam-plates L, and hence has no connection with the arm J. Fig. 3 is a front elevation of the guide-boards and operating parts, the drive-wheel being omitted. Fig. 4 is a modification, showing an endless belt with fingers substituted for the forks. Fig. 5 is an elevation of the bottom or floor of the space between boards G.

Similar letters of reference indicate corresponding parts wherever they occur upon the drawings and throughout the specification.

A is the frame or base of the machine, supported at one end on the drive-wheel B and at the other on the wheel C. The drive-wheel B is secured on the shaft or fixed arbor $b$, which extends a short distance over the frame of the machine and affords attaching means for the tongue, as will be more fully described.

A cogged rim or wheel, B', is provided on the side of drive-wheel B, and is connected therewith in such a manner as to be rotated by the revolution of the drive-wheel as the machine is being operated.

On one side of the cog-wheel B' a pinion, $d$, is engaged, which is fixed upon shaft D, which reaches across the front of frame A, and is sustained in suitable bearings thereon.

At its inner end—*i. e.*, the one farthest from the pinion $d$—the shaft D is provided with a bevel-gear wheel, $d'$, which meshes in a bevel-pinion, $e$, which is secured upon one of the upright shafts E. These shafts E are geared together by the train of gears E* beneath the frame A, which are supported in a hanger, E'.

Two of the train (the central two) are idlers, as seen, while the outer ones are fixed to the bases of the shafts E, and serve to rotate them as power is transmitted through the connection to the drive-wheel just described.

On the frame A between the shafts E is placed the knife F, which is constructed with a sharp center point, $f$, broadened toward its base at the frame A, and edges extending parallel with the edge of the frame on each side of the point $f$. This knife is stationary.

Above the knife the shafts E are provided with the reels $E^2$, partly meshing into each other, whose arms take hold of and press the stalks upon the edges of the knife as the machine advances, and cause the stalks to be severed or cut off. Instead of serving simply as a reel to draw the stalks upon the knives, the parts $E^2$ may themselves have sharpened edges and serve the purpose of rotary shears and aid in severing the stalks.

At their tops the shafts E are provided with reels $E^3$, which aid in straightening and guiding the stalks.

The upright shafts E have bearings at one end, the lower, in the frame A, and at the upper end in brackets set upon the boards or guide-frames G G. These boards or guide-frames will now be described in detail. They are set in a vertical position upon the frame A, and back of the shafts E lie approximately parallel with each other, with a space between them sufficient for holding a considerable bundle of stalks. They may be made of wood or metal, and may be solid boards or walls, or may be an open frame-work of any suitable material; but for the purpose of keeping the blades of the corn in place and preventing them from getting out into the gearing and working parts of the machine these parts G G are preferably solid boards.

In front of the posts E the boards G G are sloped from the top edge downward and forward toward the bottom, where they terminate in a sharp or well-defined rounded point, $g$. These forward portions of the boards are also flared outward from each other, so as to make a gradually-decreasing space from the points $g$ back to the cutting devices, where the boards cease to flare and become approximately parallel to each other from side to side of the frame A, as already explained, and have horizontal slots $g^*$ at the bottom and mid-height for the arms I. The flared and beveled forward ends of the boards serve to receive the stalks and guide them to the knife. Where the rows of corn are not straight or the corn has become "straggled" or "down" the form and flaring position of these forward ends serve to support the chains and sprocket-wheels and aid them to gather it in and straighten it up for being properly severed by the cutting device. Between the boards back of the cutting device the severed stalks are held in an upright position and conveyed rearwardly in this position to be first bound into bundles and then delivered to the ground.

The fronts of the boards G G are provided with the fingers or pins $h\ h$, &c., secured upon endless traveling belts or chains H H. These work over rollers H' at top and bottom; or, in case the belts H are substituted by chains, sprocket-wheels will take the place of the rollers H'. The top roller or sprocket-wheel, H' on one side is connected by a belt or chain to a wheel, $e'$, on one of the shafts E, and is thereby rotated and the belt or chain H caused to travel. The opposite side may be similarly equipped with connections to the opposite shaft, E, and both belts be thus kept moving. The pins or fingers $h$ on the inside of boards G G are always moved upward and inward and take hold of and deliver the stalks in a practically straightened condition to the knife.

We employ arms I I, which take hold of and convey rearwardly between the boards G G the severed stalks as they come from the knife. The arms I I act with great accuracy and efficacy in conveying the severed stalks back through the space between the parallel portions of the boards G. They work through slots $g^*\ g^*$ in both of the boards G, and are caused to protrude across the space between the boards at the front of the slots $g^*$—i. e., next to the knife—and then are drawn rearwardly while thus protruded, and when the rear ends of the slots are reached or the limit of this movement of the arms they are drawn out from between the boards, and while thus withdrawn are moved forward and made ready to be protruded into the space between the boards G again. At each rearward movement of the arms a number of stalks are carried back.

To produce this action of the arms the following mechanism is employed: On the side of the gear rim or wheel B' opposite to that with which gear $d$ is engaged, a gear or pinion, $q$, meshes, which is fast upon the shaft Q, which it turns when the machine is going forward, which extends across the frame A parallel to and is supported thereon in a manner similar to shaft D. At its end farthest from pinion $q$ the shaft Q is provided with a cam constructed of a pair of cam-plates, L, connected by the eccentric-pin $l$, but not otherwise connected or joined together, so that the cam-groove or space $l^*$ between the cam-plates extends entirely through between the plates L. The arms I I are secured upon the end of the bar J, which is supported in slots $k$ in the two arms of the bracket K. These slots allow horizontal movement in both directions to the bar J, but prevent vertical motion. The bar J is provided with a cross-slot, J', in the wings $J^2$. The eccentric-pin $l$ works in the slot J', and, as the cam-plates L are rotated, causes the longitudinal movement of the bar J, while the cam-groove $l^*$ causes the transverse horizontal movement of the bar J. The relative positions of the bends or crooked portions of the groove $l^*$ and the pin $l$ are such as to keep the arms I I thrust in between the boards G as they are moved from the front to the rear, and to keep them withdrawn as they are moved to the front again. Thus, as the machine is drawn forward over the ground and the stalks are cut, they are seized by the arms I I and conveyed backward in an upright position between the boards G G.

The bottom of the space between the boards G G is stationary and provided with beveled sections or blocks gradually inclined on the front side and sharply inclined on the rear, as shown at $g^a$, Fig. 5, with the higher portion of the incline at the rear end thereof, so that the butt ends of the stalks will be prevented from slipping forward toward the knife, but at the same time will readily ride over the said sections or blocks.

To stiffen the bottom front edge of the boards G, a brace or plate, G', set at right angles to or bent out from the bottom of the boards G, may be employed. This will render the points $g$ less liable to be bent or broken.

The tongue M is secured to the portion of the fixed axle $b$ which extends inward over the frame A, and is provided with a means for being engaged with the upright or standard N, which is provided with a line of holes, $n$, and is thereby made adjustable when the engagement between the tongue and this standard is made by a pin passing through them. By adjusting this standard up or down in or on the tongue the front edge of the frame A is elevated or lowered, and the knife also, whereby the stalks may be cut higher or lower.

The cam-plates L, eccentric-pin $l$, and bar J are adapted for application to a wide range of mechanism, and may be used in many other situations quite as well as in the corn-harvester.

By duplicating the parts—such as the pair of boards G, the knife, the shears or reels, and the means for operating them, and for drawing the stalks back between the boards—we may cut two rows of corn or cane at once. The frame or table A is particularly adapted for such duplication, as it affords ample means for supporting the parts.

We have made the intermeshing knives herein shown part of the subject-matter for a separate application for patent, filed June 24, 1885, Serial No. 169,648.

Having thus described our invention, what we desire to claim and secure by Letters Patent is—

1. The boards or guide-frames G G, extending rearwardly from the knife parallel or approximately parallel with each other and having the horizontal slots $g^*$ $g^*$, one at mid-height and the other near the bottom, and in front of the knife having inclined edges flared outward with the sprocket-wheels at top and bottom, and chains or belts with projecting fingers run over said wheels, and the stalk-conveying forks projecting through the slots $g^*$, as set forth.

2. The combination, with the boards G G, having the slots $g^*$ $g^*$ of the arms or hooks I, and bar J, to which they are secured, said bar being slotted at the rear end, as described, and with the plates L, having the eccentric-pin $l$, working in the slot in the bar J, as set forth.

3. In a corn-harvesting machine, the combination of the arms I, bar J, cam-plates L, and means for operating it, whereby the arms or hooks I are given an inward and backward movement and an outward and forward movement, substantially as set forth.

4. The combination of the cam-plates L, united by the eccentric-pin $l$, means for rotating said cam-plates, the bar J, having the cross-slot J', and provided with arms I I, and the horizontally-slotted bracket K, substantially as described, and for the purpose set forth.

5. The combination of the drive-wheel B, cog-wheel B', pinion $d$, gearing into wheel B', shaft D, upon which said pinion is placed, bevel-wheel $d'$, pinion $e$, shafts E E, and cutting devices, and the pinion $q$, shaft Q, on which it is placed, cam-plates L, secured on shaft Q, eccentric-pin $l$, uniting said plates, slotted bar J, and arms I I, substantially as set forth.

6. The herein-described corn-harvesting machine, consisting of the frame A, drive-wheel B, and cogged wheel B', the wheel C, the shafts D and Q and their pinions $d$ $q$, gearing into wheel B', the bevel-wheel D', the pinion $e$, shafts E, and gear-connection, the rotating reels or cutters $E^2$, reels $E^3$, knife F, guides G G, having inclined and flared extensions in front of the cutting devices, as described, belts or chains H $h$, placed in an inclined position along the inclined edges of the boards G G, and means for operating them, cam-plates L, bar J, and arms I, all arranged and combined to operate substantially as set forth.

7. The cam-plates L, and eccentric-pin $l$, by which they are united, bar J, mounted on said eccentric-pin, and the slotted bracket for guiding the bar J, all constructed and combined, substantially as set forth.

In testimony whereof we affix our signatures in presence of two witnesses.

LEDYARD VERDINE LEWIS.
STEPHEN STOWE ALLEN.

Witnesses:
JOHN HUYCK,
NICKLAUS BARTH.